(12) United States Patent
Tadokoro et al.

(10) Patent No.: US 7,719,535 B2
(45) Date of Patent: May 18, 2010

(54) METHOD FOR DISPLAYING CHARACTER STRINGS

(75) Inventors: Mizuho Tadokoro, Yamato (JP); Takashi Inui, Yokohama (JP); Kazuya Tsukizawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 2009 days.

(21) Appl. No.: 09/755,308

(22) Filed: Jan. 2, 2001

(65) Prior Publication Data

US 2001/0051867 A1 Dec. 13, 2001

(30) Foreign Application Priority Data

Feb. 14, 2000 (JP) ............................. 2000-034610

(51) Int. Cl.
*G06T 11/00* (2006.01)
(52) U.S. Cl. ...................... 345/467; 345/419; 717/140; 717/141; 717/143; 717/122
(58) Field of Classification Search ................. 345/467, 345/703, 533; 715/513, 533, 536, 540; 717/140, 717/141, 143, 122, 137, 169, 170
See application file for complete search history.

(56) References Cited

U.S. PATENT DOCUMENTS 5,644,775 A * 7/1997 Thompson et al. ............. 704/7
6,802,059 B1 * 10/2004 Lyapustina et al. .......... 717/143

OTHER PUBLICATIONS

Corel Wordperfect, 1996, Version 6.1, pp. 1-10.*
Winter et al., Using Microsoft Office Professional for Windows 95, 1996, special edition, pp. 244-245.*

* cited by examiner

*Primary Examiner*—Kimbinh T. Nguyen
(74) *Attorney, Agent, or Firm*—Anne Vachon Dougher

(57) ABSTRACT

A system and method for translating character strings into another national language and displaying the translated character strings without updating any source code. The character strings are displayed on GUI environment upon the execution of the object computer program. The method for displaying character strings on GUI environment provided by a computer program comprises the steps of; (a) providing an executable program; (b) providing a text file including the character strings and being openable with the executable program; (c) executing the executable program (301); (d) retrieving the text file from the executable program (307); and (e) displaying the character strings included in the opened text file (315).

2 Claims, 7 Drawing Sheets

```
// CSampleDlg message handlers

BOOL CSampleDlg::OnInitDialog()
{
    TCHAR szRet[128];

CDialog::OnInitDialog();

SetIcon(m_hIcon, TRUE);              // Set big icon
    SetIcon(m_hIcon, FALSE);     // Set small icon if (GetINIString(szRet, IDS_STR_TITLE,_T("IDS_STR_TITLE")))
        SetWindowText(szRet);
    if (GetINIString(szRet, IDS_STR_SERIAL,_T("IDS_STR_SERIAL")))
        SetDlgItemText(IDC_STATIC_SERIAL, szRet);
    if (GetINIString(szRet, IDS_STR_PARA,_T("IDS_STR_PARA")))
        SetDlgItemText(IDC_STATIC_PARA, szRet);
    if (GetINIString(szRet, IDS_STR_MODEM,_T("IDS_STR_MODEM")))
        SetDlgItemText(IDC_STATIC_MODEM, szRet);
    if (GetINIString(szRet, IDS_STR_IR,_T("IDS_STR_IR")))
        SetDlgItemText(IDC_STATIC_IR, szRet);
    if (GetINIString(szRet, IDS_STR_AUDIO,_T("IDS_STR_AUDIO")))
        SetDlgItemText(IDC_STATIC_AUDIO, szRet);
    if (GetINIString(szRet, IDS_STR_OK,_T("IDS_STR_OK")))
        SetDlgItemText(IDOK, szRet);
    if (GetINIString(szRet, IDS_STR_HELP,_T("IDS_STR_HELP")))
        SetDlgItemText(IDHELP, szRet);

if (GetINIString(szRet, IDS_STR_EN,_T("IDS_STR_EN"))) {
        SetDlgItemText(IDC_STATIC_SERIAL1, szRet);
        SetDlgItemText(IDC_STATIC_PARA1, szRet);
        SetDlgItemText(IDC_STATIC_AUDIO1, szRet);
    }
    if (GetINIString(szRet, IDS_STR_DIS,_T("IDS_STR_DIS"))) {
        SetDlgItemText(IDC_STATIC_MODEM1, szRet);
        SetDlgItemText(IDC_STATIC_IR1, szRet);
    }
```

FIG. 4A

```
        // TODO: Add extra initialization here return TRUE; // return TRUE unless you set the focus to a control
}

//Load String
BOOL GetINIString(TCHAR *pszRet, UINT nID, TCHAR *pszKey)
{
        TCHAR szIniFile[MAX_PATH], szRet[128];

wsprintf((LPSTR)szIniFIle, "%s\\Sample.ini", cur_dir);
        GetPrivateProfileString("GENERAL",
                                                "LD",
                                                "",
                                                (LPTSTR)szRet,
                                                128,
                                                szIniFile);
        if (!lstremp("YES",(LPSTR)szRet){
                GetPrivateProfileString("STRINGS", (LPSTR)pszKey, "",
                                                (LPTSTR)szRet,
                                                128,
                                                szIniFile);
                if (lstlen ((LPCTSTR)szRet)) {
                        lstrcpy((LPTSTR)pszRet, (LPCTSTR)szRet);
                        return TRUE;
                }
        }

LoadString(AfxGetInstanceHandle(), nID,szRet, 128);
        lstrcpy((LPSTR)pszRet, (LPCTSTR)szRet;
        return TRUE;
}
//Load String
```

FIG. 4B

```
[GENERAL]
LD=YES

[STRINGS]
IDS_STR_TITLE="デバイス構成"
IDS_STR_SERIAL="シリアル・ポート"
IDS_STR_PARA="パラレル・ポート"
IDS_STR_MODEM="モデム"
IDS_STR_IR="赤外線ポート"
IDS_STR_AUDIO="オーディオ"
IDS_STR_EN="使用する"
IDS_STR_DIS="使用しない"
IDS_STR_OK="了解(&Q)"
IDS_STR_HELP="ヘルプ(&H)"
```

FIG. 5A

```
[GENERAL]
LD=YES

[STRINGS]
IDS_STR_TITLE="Configuration de périphérique"
IDS_STR_SERIAL="Port série"
IDS_STR_PARA="Port paralléle"
IDS_STR_MODEM="Modem interne"
IDS_STR_IR="Port infrarouge"
IDS_STR_AUDIO="Audio"
IDS_STR_EN="Activer"
IDS_STR_DIS="Désactiver"
IDS_STR_OK="&OK"
IDS_STR_HELP="&Aide"
```

FIG. 5B

METHOD FOR DISPLAYING CHARACTER STRINGS

FIELD OF THE INVENTION

The present invention relates to a method for creating a computer program which can be modified easily. The present invention also relates to a method for creating a program which enables easy modification of character strings to be displayed on GUI environments provided by a computer program and character strings related to computer operations. Furthermore, the present invention relates to a method for creating a program, which enables easy supporting of many national languages.

BACKGROUND OF THE INVENTION

Application programs (hereafter, to be referred to simply as applications) developed for specific purposes of users are executed interactively through various message provided to the users. Usually, personal computers employ a human interface referred to as a GUI (Graphic User interface) so as to use icons, characters, graphic images, etc. denoting execute command and functions in processings concerning computers and facilitating users' understanding of the meanings and functions of those items intuitively.

An application, when it is operated under such an operating system (OS) as the Windows (a trademark of Microsoft Corp.) and OS/2 (a trademark of IBM Corp.), which supplies the GUI environment, uses the API Application Program Interface) included in a library of each of those operating systems so as to facilitate user display of input environments, input methods of commands, and data by means of characters and graphics on windows, as well as processing results, etc. And, since the system of distributing commodities for applications is expanding more and more throughout the world, opportunities to use applications developed by a national language in other language countries are increasing rapidly. Consequently, it has been strongly demanded that characters used in those applications corresponded to many national languages.

Usually, an application is created so as to match with the language of its employed operating system. For example, an operating system created in English displays the GUI messages in English. And accordingly, applications running on the OS are developed so as to display, messages in English. In addition, if an application calls an OS, the application sends a character string message to the OS and the OS determines the language type (English, Japanese, etc.), the size (full size, half size, etc.), the character font, etc. with respect to each character string and receives the message as a correct one only when the message agrees to a predetermined definition before executing the processing in some cases.

Assume now that a French person uses an application in English developed under an English OS. In this case, the character strings of the application should preferably be translated into French. This is because the French user could understand messages of the application displayed on the GUI environment if the messages appear in French rather than in English.

Usually, an application includes both code part describing instructions executed by a CPU and data part describing their parameters. One type of data included in such an application is referred to as a resource. A resource includes icons, cursors, menus, dialog boxes, characters of a specific language, etc. Such resources are used widely in the GUI, multi-media programs, etc.

When developing an application corresponding to many national languages, it would thus be convenient to divide the application into the main file and its subroutines, that is, resource files. Applications are described in a source code format in accordance with such a program language as Assembler, COBOL, FORTRAN, C/C++, PL1, etc. that can be understood by human beings.

A resource file includes character strings created in a specific language and in a specific format. Those character strings are used for messages provided to the GUI and the subject OS. If a source program created in a national language is to be translated into another national language, then character strings that are used for messages of the source code of the resource file are translated; the source code in the main file is not modified at all. Because the computer cannot understand any source codes, the source codes of both main file and resource file are compiled respectively into object codes. Then, libraries provided by the OS are assembled in the object codes as needed, thereby creating an executable program. Such object code is also referred to as the machine language represented by "0" and "1."

The main file opens a resource file dynamically so as to provide character strings used for messages included in the resource file to the user through the GUI and/or provides the character strings directly to the OS. Consequently, if an attempt is made to translate messages of an application into another national language so as to operate the application, it is necessary to translate the character strings in the resource file described with a source code so as to prepare a resource file described in each national language, then compile the resource file again, thereby creating an executable program.

Published Unexamined Patent Application No. 10-116185 discloses a technique for creating such a resource file. In addition, U.S. Pat. No. 5,644,775 discloses a technique for separating the text part in an application from the program body, thereby registering it in a library so as to make it easier to translate messages into many national languages. A library includes character strings for displaying texts related to a plurality of applications and character strings related to a specific application.

If an application is created so as to support many national languages, the conventional method has to translate character strings equivalent to messages of the resource file described with the source code first, then compile the resource file so as to be combined with the main file and create an executable program, and finally verify the operation of the program. The developer of the application has therefore to create the application described with a source code as many as the number of the supported languages beforehand and compile each of those applications so as to convert it into an executable program comprising an object code before delivering the program. Consequently, if the program is requested to be translated into still another non-supported language after it is delivered, the developer has to update the source code of the program.

If an attempt is made to run an application program described in English under the control of an English language OS that supports Japanese fonts in Japan, it is naturally demanded that at least important messages should be displayed in Japanese. For example, a message for prompting the user to use an AC adapter when the residual capacity of the battery of his/her portable computer reaches the low level is important from the viewpoint of preventing loss of work data. In many cases, therefore, it has been demanded that at least such a message should be displayed in Japanese as long as the translation does not affect the program badly.

Furthermore, even under the control of the same OS language, if the OS version is upgraded, a problem often arises; the applications having been developed in accordance with the old OS do not run normally. Character strings in a resource file are used as messages to the OS. In some cases, therefore, even in applications developed under the control of a Japanese language OS, if the OS version is upgraded, such that, for example, the OS accepts messages described only with full-size characters at first and after the version-up, the OS is modified so as to accept messages described only with half-size characters. In such a case, the character strings in the resource file described with a source code must be described with half-size characters. And, in order to solve such a problem, there is a need that character strings can be modified easily without modifying any source codes of the main file and the resource file.

Under such circumstances, it is an object of the present invention to provide a method for creating a computer program, a program structure, and a recording medium which can be modified easily.

It is another object of the present invention to provide a method for creating a computer program, a program structure, and a recording medium that can modify character strings therein without modifying any source program.

It is still another object of the present invention to provide a method for creating a computer program, a program structure, and a recording medium that can modify character strings therein easily so as to cope with changes of languages and changes of program operation environments which may occur in a computer program that provides the GUI environment including display of character strings.

SUMMARY OF THE INVENTION

The foregoing and other objects are realized by the present invention for creating character strings of a computer program as a text file. The character strings included in the computer program are equivalent to messages provided to the GUI and messages to be exchanged with other programs with respect to the operations of the subject program. The text file, when it is opened by a program, provides character strings to the program. The text file is described in a format to be opened and retrieved by the programs, so there is no need to modify programs themselves even when those messages are modified. Such text files can be modified very easily with use of a text editor.

As described above, one of the aspects of the present invention is a method for displaying character strings on GUI environment provided by a computer program. The method includes the steps of (a) providing an executable program, (b) providing a text file including the character strings and being openable with the executable program, (c) executing the executable program, (d) opening the text file and retrieving the character strings from the executable program, and (e) displaying character strings included in the opened text file.

A text file includes character strings and is composed so as to be opened from its executable program. Consequently, the executable program can retrieve character strings in the text file so as to display those character strings on the GUI environment. To modify a character string to be displayed, it is only required to provide the modified text file. Character strings may be displayed on the GUI environment and may be used as messages of another program. The programs of the present invention are not limited only to application programs; they may be such programs as other service programs, device drivers, etc. They may be any programs including character strings equivalent to GUI messages and other messages to be exchanged with other programs.

The present invention additionally comprises a method for displaying character strings on the GUI environment provided by a computer program. The method includes the steps of (a) providing an executable program, (b) providing a text file including the character strings and a search key and being openable with the executable program, (c) executing the executable program, (d) searching the search key, (e) retrieving character strings in the text file when the search key enabled is detected at step (d), (f) displaying the retrieved character strings, and (g) displaying character strings embedded in the executable program when the search key disabled is detected at step (d).

Provided with such a configuration, if "enable" is set in the search key of the text file, character strings in the text file are retrieved. If "disable" is set in the search key, character strings included in the executable program are used. Consequently, a text file can be created so as to cope with a necessity of translating the language of an executable program on the GUI environment, as well as a change of the subject OS operation environment. Concretely, character strings in a program can be controlled only by editing the text file.

Still another aspect of the present invention is a structure of such a computer program, a method for creating such a computer program, and a recording medium. Still another aspect of the present invention is a method for creating a computer program including character strings related to computer control. According to these objects of the present invention, such character strings can be provided to a program as a text file. It is thus possible to easily solve a problem that character strings do not match with the subject OS environment only by updating the text file.

BRIEF DESCRIPTION OF THE DRAWINGS

The invention will now be described in greater detail with specific reference to the appended figures wherein:

FIG. 4 is a source code of an application according to the embodiment of the present invention;

FIG. 5 shows a text file according to the embodiment of the present invention.

DETAILED DESCRIPTION OF THE INVENTION

Computer Configuration

Figure 1:
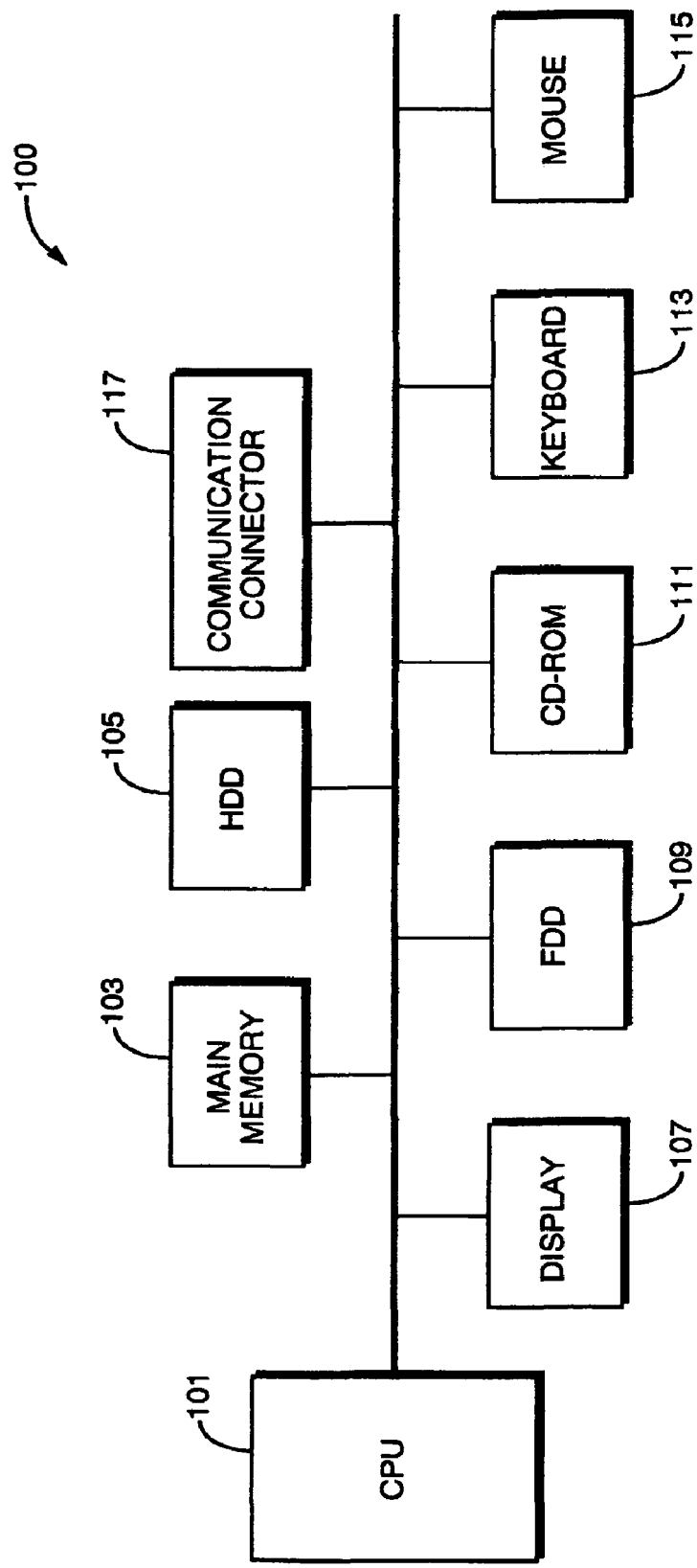
FIG. 1 is a schematic block diagram of a computer for executing an application according to the embodiment of the present invention.

FIG. 1 is a schematic block diagram of a computer that executes an application according to the present invention. A CPU (Central Processing Unit) 101 is a core part of the computer 100 and controls inputs/outputs of data and processes instructions, etc. of the computer totally. A main memory 103 temporarily stores programs and data and provides an area for storing a program before it is transferred to the CPU 101 and for storing work results after the CPU 101 executes the program and processes data inside the computer.

An HDD 105 stores various programs and data, such as an OS, BIOS, device drivers, and application programs to be executed by the computer 100. Those programs and data stored in the HDD 105 are transferred to the main memory 103 and to other components as needed. The programs and data stored in the main memory 103 are erased when the power provided to the computer is turned off; but, the programs and data stored in the HDD 105 are kept as they are even when the power provided to the computer is turned off.

A display 107 is combined with a keyboard 113 and a mouse 115 to compose a human interface. The display 107 displays graphical output information for the user on the GUI environment and allows the user to operate the computer and execute programs. The keyboard 113 permits the user to instruct the computer with numerals, characters, symbols, etc. The mouse 115 moves the cursor displayed on the display of the GUI environment to access icons on the display to execute commands and to instruct a program to execute various actions. An FDD (Floppy Disk Drive) 109 drives a floppy disk loaded therein. A CD-ROM drive 111 is dedicated to read data from a CD-ROM loaded therein. A communication connector 117 is an interface for connecting such Internet/Intranet to the computer.

The HDD 105 stores such operating systems as Windows, OS/2, etc. for supporting a GUI environment respectively. The object OS is read into the memory when the computer is started up. The OS supplies the basic functions necessary for an application to realize the GUI as an API stored in a library. There are also such libraries as a static link library embedded in an executable file when in compiling and a dynamic link library (DLL) to be dynamically opened from execution files.

FIG. 1 is a schematic block diagram of the above computer with only that which is necessary for describing the embodiment of the present invention. Actually, as is well known, many more components are mounted and connected to each other differently in each of such computers. Consequently, the program of the present invention can be executed in any computers composed within a range of the concept of the present invention.

Figure 2:
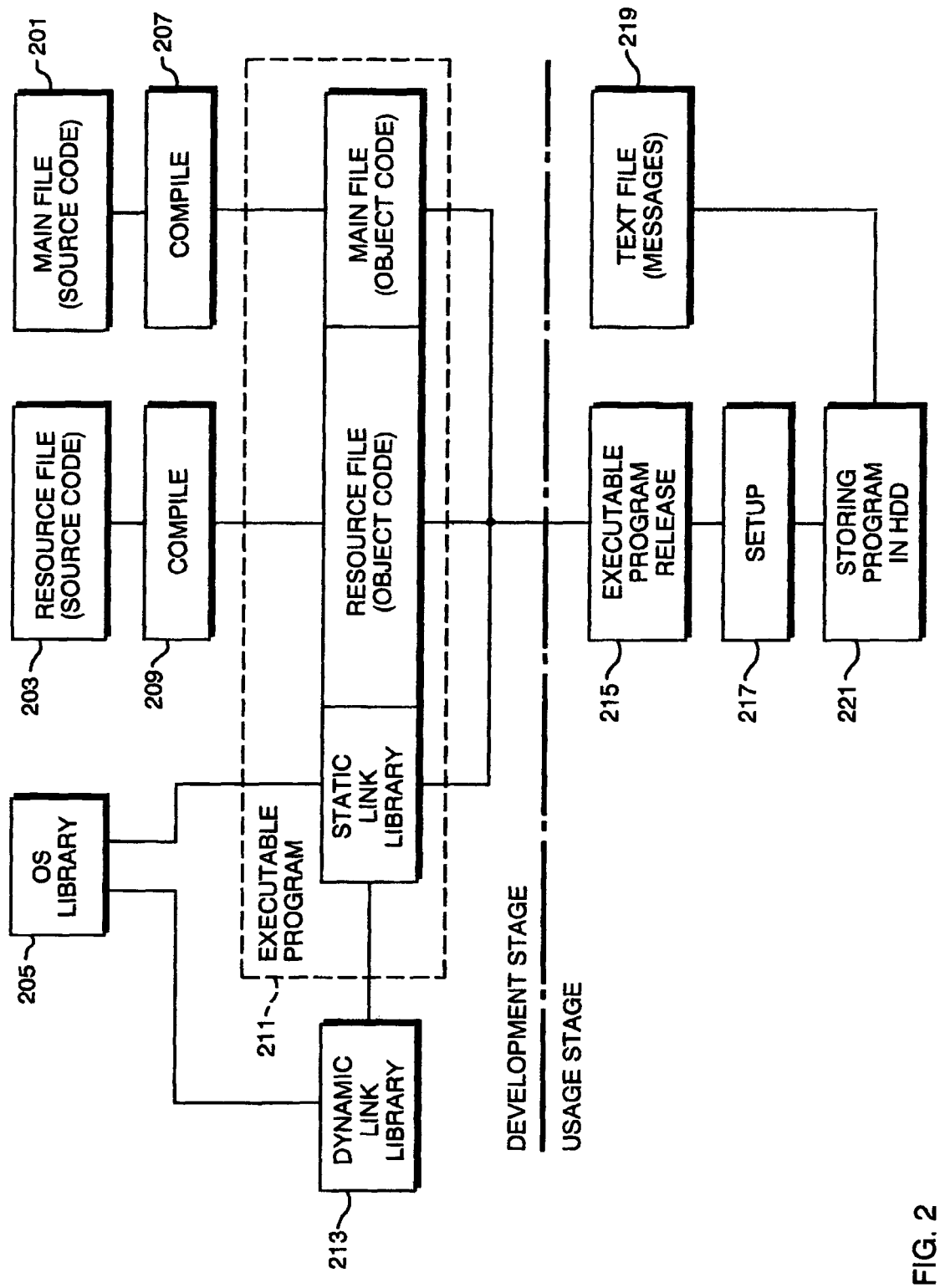
FIG. 2 is a flow chart of how to create an application according to the embodiment of the present invention.
Figure 3A:
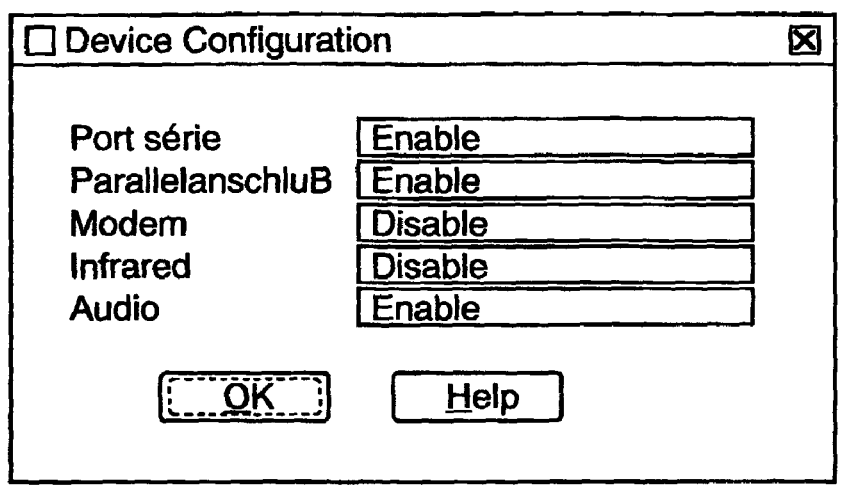
FIG. 3 shows window images of the GUI displayed by an application according to the embodiment of the present invention.

FIG. 2 shows a flow chart of how to create an application in the embodiment of the present invention. FIG. 3 shows a window equivalent to a GUI provided by an application on the display. Assume now that the OS running in the computer 100 supports fonts in Japanese, English, and French, that the application is created in English, and that only the character strings in the window are to be translated in Japanese or French. FIG. 3 shows images of windows at 3(A), 3(B), and 3(C) provided by an application in this embodiment; the character strings displayed are translated into English at 3(A), then into Japanese at 3(B) or French at 3(C).

The application in this embodiment comprises a main file (block 201) described with a source code and a resource file (block 203) described with a source code. However, it is not critical to the present invention whether the application is divided into modules or not (as will be described later) and the odes can be described in any program languages.

Main File Structure

The main file specifies the main functions of the subject program. Generally, the main file is created so as to display character strings matching with the OS language in windows. FIG. 4 shows part of the source code of the main file. To display a message comprising character strings in a window while the main file is executed, a resource file (the source code is not illustrated) is called from the main file, thereby displaying the message prepared in the resource file in addition, the main file includes a code for searching the state of the search key in the text file (to be described later) dynamically. The search key shows that a character string, denoting a message to be displayed in a window by the subject application, is defined in the text file, not in the resource file.

If the main file is executed and "enable" of the search key is detected, then the character strings in the text file are displayed. If "disable" of the search key is detected, then the character string described as a default one in the resource file is displayed. The main file can display character strings in the text file if the search key is so set, and display a message in the resource file as a default message if the search key is not set.

Resource File Structure

A resource file defines a graphics object related to the main file. A resource file comprises such data as icons, cursors, menus, dialog boxes, specific language characters, etc. A resource file supplies a human interface dedicated to the subject program. A resource file is created so as to facilitate translation of the message characters in another national language.

A resource file is described in a program language and includes a code part, equivalent to instructions, and a character string part, equivalent to messages. Conventionally, at the time of translating a character string denoting a message, it has been necessary to translate only the character string part of the source code of the resource file. According to the present invention, however, there is no need to modify the resource file. A resource file receives an instruction from the main file to display the default character string on the display.

Executable File

Next, the source codes of both the main file and the resource file are compiled, thereby creating an executable program 211. The application program in this embodiment is developed for a specific OS that supports the GUI. The main file and the resource file describe only the substantial part of the application. The object codes in these two files are insufficient to let the GUI execute specific functions in a computer, although they are sufficient to provide the GUI. It is necessary to use services supplied by the OS.

After the source codes of both main file and resource file are compiled so as to create object codes, therefore, those object codes are linked with each other. The static link library included in the OS library (block 205) is embedded in the object codes and corresponds to the object codes so as to be linked with the dynamic link library with use of a linker. An executable program developed in such a way can thus be operated when installed under the same control of the OS as the OS under which the program is developed.

The application of the present invention is therefore characterized as described above in that the executable program of this application can be executed with use of a default character string described in the resource file regardless of whether the text file is used or not. After this development stage, the application program is distributed as a package recorded in such a recording medium as a floppy disk and/or a CD-ROM. The application program will also be downloaded through a network with use of the communication connector 117 of the computer 100.

Text File Configuration

The present invention is also characterized in that character strings can be described easily in the usage stage of the program. An executable file is created so as to be operated perfectly including displaying of messages under the control of the initial OS. However, It is demanded in some cases that only messages which are to appear in windows be translated in another national language after the application is released. In addition, character strings described in a resource file are sent to the OS as messages when the application is executed. If an OS version is upgraded in the development stage of an application, the application will not run under the control of the OS even when the OS language remains the same. This is because character sizes (full-size and half-size) are different between the original and upgraded versions of the OS. In such a case, therefore, the main file will be requested to open character strings different from those in the resource file in some cases.

A text file is provided in a block 219. It is very meaningful that the block 219 is not a development stage, but it is an application stage after releasing. Unlike a program code, a text file is not converted to an object code with use of any of an assembler, a compiler, and an interpreter so as to be executed by a computer, but it can be edited by a text editor so as to provide character strings to be displayed according to the GUI environment or used as messages sent from program to program. A text file, if the OS enables it, may use any character code sets, such as ASCII (American Standard Code for Information Interchange) regulated by ANSI (American National Standards Institute), JIS Code (JIS X 0208), Shift JIS, and EUC (Extended Unix Code), etc. regulated by JIS (Japan Industrial Standards). If the OS is Windows, INI-formatted files regulated by Microsoft Inc. can be used as text files. This is because INI-formated files are excellent in searching properties.

FIG. 5 shows an embodiment of such a text file created so as to correspond to two national languages of Japanese at 5(A) and French at 5(B). The text file 219 provided in the embodiment of the present invention includes a search key to be searched from the executable program. In FIG. 5, "LD" denotes a search key. "LD=YES" denotes that the search key is "enable." If BOOL CSampleDlg::OninitDialog in the main file shown in FIG. 4 is executed, the GetINIString function is called and the GetINIString function searches the search key of the target text file. If the search key is detected to be "enable," the executable program reads character strings having an identifier "IDS_STR_ . . . " respectively from the text file.

Figure 3B:
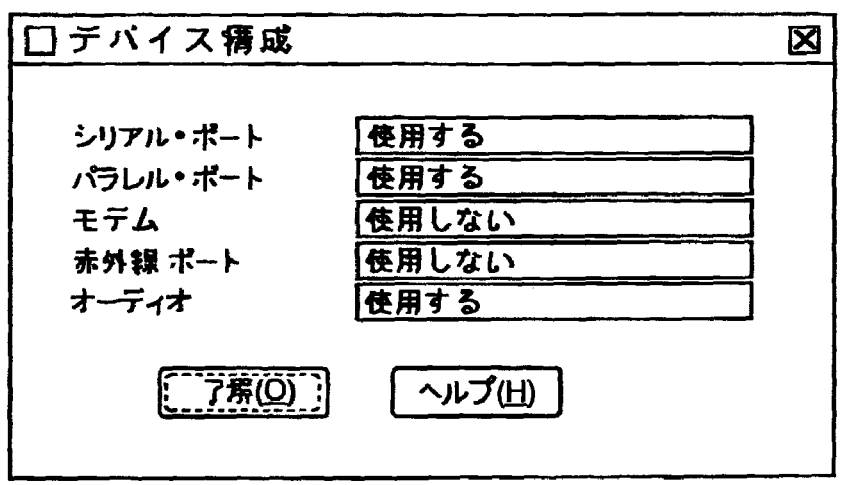
Figure 3C:
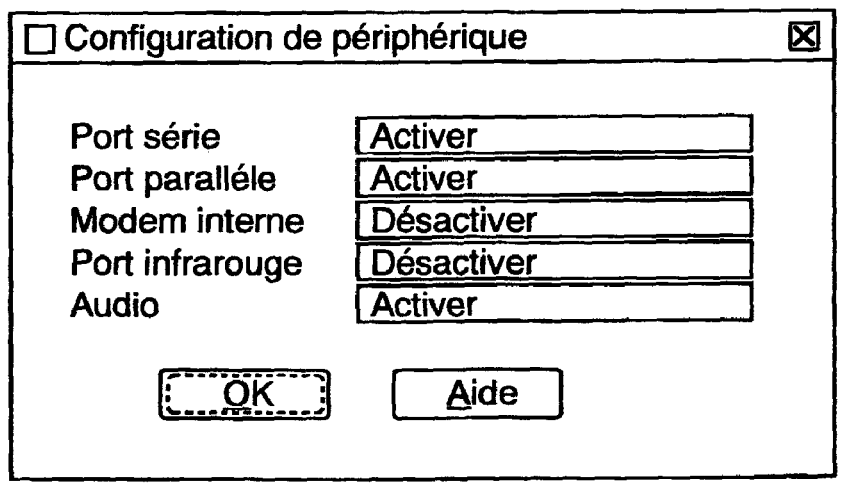

At this time, if the identifier of the text file shown in FIG. 5(A) is set to "enable," a window including character strings in Japanese as shown in FIG. 3(B) is provided upon execution of the application. If the identifier of the text file shown in FIG. 5(B) is set to "enable," a window including character strings in French as shown in FIG. 3(C) is displayed. The text file 219 can be created by any person, for example, technicians in charge of program sales or services (hereafter, to be referred to as users including the end users of the program).

Setting Up

A created text file is stored in a common directory area provided in the HDD 105 so as to be searched from the executable program in addition, a text file with no data recorded therein should preferably be prepared in the package of the executable program 211 so as to be related to a directory. The executable program package usually includes a set-up program (block 217) assisting installation of programs into the target computer.

If such a set-up program is used to install a program, the set-up program asks the user whether it needs to translate messages into another national language and to modify those messages so as to correspond to the upgraded OS. The user thus writes translated or modified messages into the text file according to the instructions from the set-up program. As a result, the user is freed from selection of a directory for the text file and from the troubles caused by translation of unnecessary portions, thereby affecting the program operation badly.

As described above, the present invention is characterized in that the developers of programs are freed from modification of source codes, which have been required as a result of translation and modification of character strings related to messages and operations with respect to the GUI environment of application programs. Thus, text file editors are not requested to modify any of executable files and source programs; they are just requested to describe search keys, identifiers, and character strings for text files.

Storing Data into HDD

To enable the executable program 215 to run in a computer, the set-up program, at the time of storing an application into the HDD 105 (block 221), decides its storage place, sets start-up conditions, and decides a memory area if a work file exists. If there is a library to links the set-up program sets the linking conditions. Finishing the execution of the above procedure, the application can be executed in the computer 100.

Figure 6:
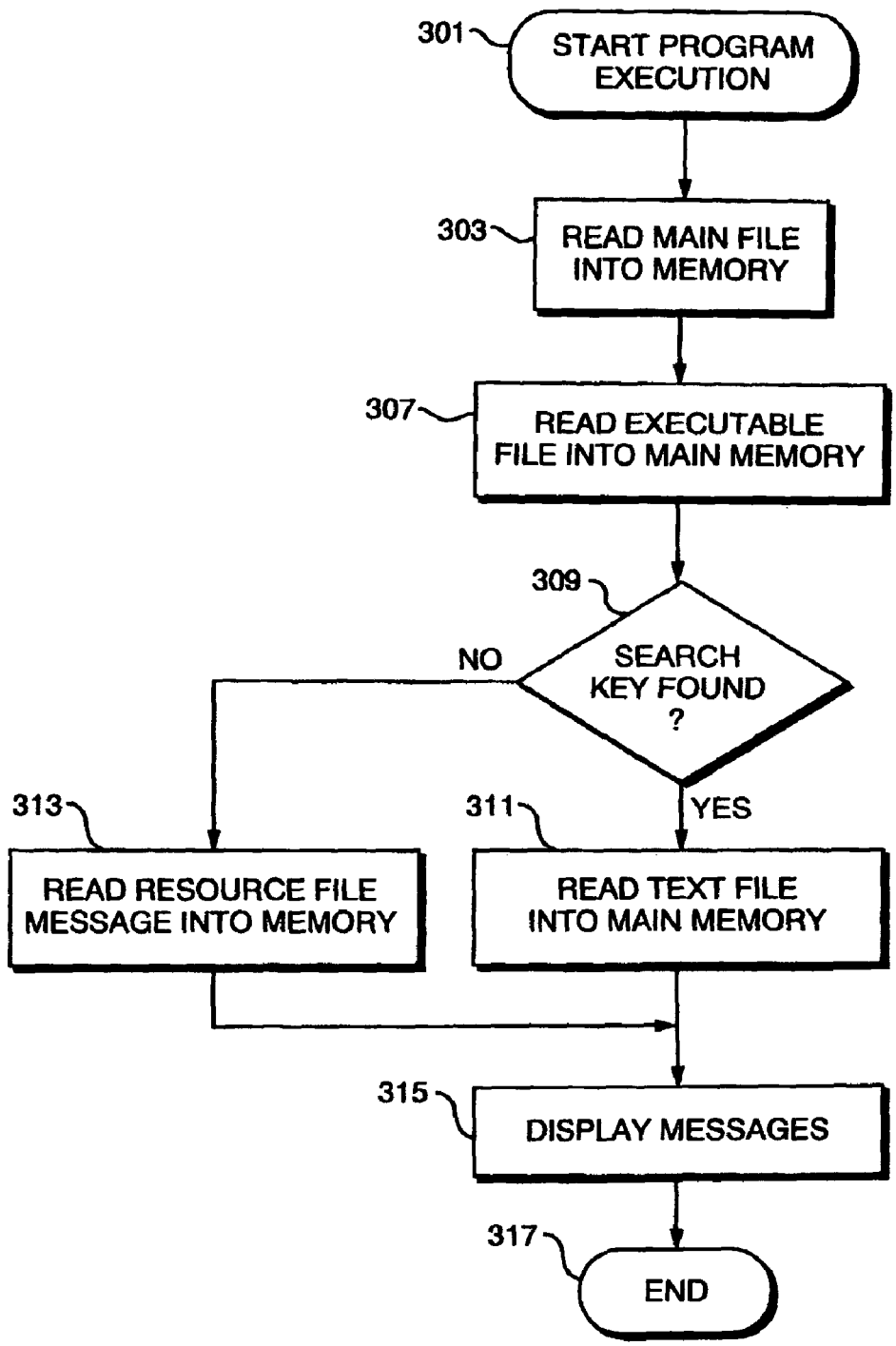
FIG. 6 is a flow chart of a procedure for executing an application according to the embodiment of the present invention.

FIG. 6 shows a flow chart of a procedure for executing an application. On GUI environment, a command for starting up a program is displayed as an icon on the display 107. The user then operates the mouse 115 to execute the START command (block 301). When the program is started up, the executable program is read into the main memory (block 303). At this time, only part of the executable program may be read into the main memory. For example, it is enabled that the resource file may be left in the HDD so that the only necessary part of the resource file is transferred to and executed in the main memory when it is called from the main memory. The dynamic link library is read into the main memory only when it is called from the executable program and executed there.

The main file in the executable program then calls the resource file as needed so as to provide a GUI environment and execute predetermined functions. The resource file mainly defines display of data. In addition, the main file searches the search key described in the text file (block 307). The search key controls whether to use character strings embedded in the resource file from the beginning or to replace the character string with character strings described in the text file.

When a search key is set to "enable" in block 307, the character strings in the text file are read into the main memory so as to display the character strings on the display 107 and send them to the OS as messages. If the search key is set to "disable" in the block 309, the main file reads character strings from the resource file into the main memory so as to display them on the display 107 and send them to the OS as messages. Character strings read from a text file function Just like those changed from the resource file from the viewpoint of the main file. Consequently, character strings in the text file are not only displayed just as messages in a translated national language, but also operation errors are suppressed by matching formats of character strings between the main file and the OS when messages are exchanged between them.

In this embodiment, an application is divided into the main file and the resource file. However, a text file can be created completely as described above even when the resource file is not used by describing all the necessary items including the GUI definition in the main file. In addition, the text file includes all the files whose character strings are displayed by a text editor.

According to the present invention, it is possible to provide a method for creating a computer program, a program structure, and a recording medium enabling the created computer program to be modified easily after releasing. In addition, according to the present invention, it is also possible to provide a method for creating a computer program, a program structure, and a recording medium enabling character strings related to messages and operations of the GUI to be modified without modifying any source program.

Furthermore, according to the present invention, there is possible to provide a method for creating a computer program; a program structures and a recording medium enabling the character strings to be modified easily so as to cope with changes of national languages or changes of program operation environments to occur in a computer program that supplies a GUI environment including display of character strings. This will be very advantageous, since there is no need to add any source code including translated messages even when national languages that must be supported by the GUI of an application are increased after the program is released.

What is claimed is:

1. A method for creating a computer program including control-related character strings, including the steps of:
   (a) creating a text file describing said control-related text file character strings; and
   (b) creating a program file describing a code for an executable program to automatically open said text file to generate control related program messages as said text file character strings, wherein said creating a text file comprises creating a text file including a selected control-related text file character string and a search key; and, wherein said creating a program file comprises creating a program file including a default character string and a code for automatically shifting control to said selected control-related text file character string when said search key to be enabled is detected and giving control to said default character string when said search key to be disabled is detected.

2. A program storage device readable by machine tangibly embodying a program of instructions executable by the machine to perform a method to generate at least one control-related text file character string related to computer control, said method including the steps of:

automatically opening a text file including said at least one control-related text file character string to generate control related program messages as said text file character strings; and using said at least one character string described in said opened text file to control said computer, and further comprising a default character string, wherein said opening a text file comprises searching a search key of a text file including a selected control-related text file character string; and wherein said using at least one character string comprises using said selected control-related text file character string to control said computer when said search key to be enabled is detected and using said default character string to control said computer when said search key to be disabled is detected.

* * * * *